(12) United States Patent
Kremmer et al.

(10) Patent No.: US 9,622,399 B2
(45) Date of Patent: Apr. 18, 2017

(54) ARRANGEMENT FOR THE CONTROL OF A DEVICE INTERFACE OF AN AGRICULTURAL WORK VEHICLE

(71) Applicant: Deere & Company, Moline, IL (US)

(72) Inventors: Martin Kremmer, Manheim (DE); Marco Reinards, Gruenstadt (DE)

(73) Assignee: Deere & Company, Moline, IL (US)

( * ) Notice: Subject to any disclaimer, the term of this patent is extended or adjusted under 35 U.S.C. 154(b) by 16 days.

(21) Appl. No.: 14/741,033

(22) Filed: Jun. 16, 2015

(65) Prior Publication Data
US 2015/0366124 A1 Dec. 24, 2015

(30) Foreign Application Priority Data
Jun. 18, 2014 (DE) .................... 10 2014 211 712

(51) Int. Cl.
A01B 59/06 (2006.01)
A01B 63/10 (2006.01)

(52) U.S. Cl.
CPC .......... A01B 59/06 (2013.01); A01B 63/1006 (2013.01)

(58) Field of Classification Search
CPC ..................... A01B 59/06; A01B 63/1006
See application file for complete search history.

(56) References Cited

U.S. PATENT DOCUMENTS

| | | | |
|---|---|---|---|
| 6,654,355 B1 | 11/2003 | Marbach et al. | |
| 6,803,854 B1 * | 10/2004 | Adams | G08G 1/127 340/425.5 |
| 7,002,465 B2 * | 2/2006 | Komatsu | B60R 25/04 340/426.1 |
| 7,158,006 B2 * | 1/2007 | Lee | B60R 25/04 340/5.61 |
| 7,209,816 B2 * | 4/2007 | Mueller | H04Q 9/00 340/426.16 |
| 7,277,784 B2 * | 10/2007 | Weiss | A01B 69/008 172/2 |
| 7,431,108 B2 | 10/2008 | Tarasinski et al. | |

(Continued)

FOREIGN PATENT DOCUMENTS

| | | |
|---|---|---|
| DE | 10217398 | 1/2003 |
| DE | 102014211712 | 2/2015 |

(Continued)

OTHER PUBLICATIONS

Oksanen, T., Öhman, M., Miettinen, M., Visala A., "ISO 11783—Standard and Its Implementation", published 2005, all pages, retrieved from http://www.nt.ntnu.no/users/skoge/prost/proceedings/ifac2005/Fullpapers/02392.pdf.*

(Continued)

Primary Examiner — Calvin Cheung (57) ABSTRACT

An arrangement for the control of a device interface of an agricultural work vehicle includes a control unit of the work vehicle, which is connected, in a controlling manner, with an external power actuator for the adjustment of the position of the device interface, and a portable computer with input and a processor which has a wireless communication connection with the control unit and on which software was downloaded, which makes possible control of the actuator by the input, via the processor and the control unit.

7 Claims, 4 Drawing Sheets

(56) References Cited

U.S. PATENT DOCUMENTS

| | | | | |
|---|---|---|---|---|
| 7,643,890 B1* | 1/2010 | Hillen | ............... | B23K 9/0953 340/3.1 |
| 8,224,313 B2 | 7/2012 | Howarter et al. | | |
| 8,275,516 B2* | 9/2012 | Murphy | ............... | A01B 69/00 701/124 |
| 8,538,408 B2 | 9/2013 | Howarter et al. | | |
| 8,831,794 B2* | 9/2014 | Persaud | ............... | A63F 13/06 340/12.22 |
| 9,116,787 B1* | 8/2015 | Johnson | ............... | B60T 7/16 |
| 2005/0055147 A1* | 3/2005 | Hrazdera | ............ | A01B 79/005 701/50 |
| 2008/0091343 A1* | 4/2008 | Hill | ............... | E02F 9/26 701/408 |
| 2012/0256763 A1* | 10/2012 | Johnson | ............... | G08C 17/02 340/870.07 |

FOREIGN PATENT DOCUMENTS

| | | | | |
|---|---|---|---|---|
| EP | 1004230 A2 * | 5/2000 | ............ | A01B 63/00 |
| EP | 1004230 | 8/2006 | | |

OTHER PUBLICATIONS

"Agricultural Solutions: ISO-11783-2 Connectors for Modern Agriculture Technology" all pages, date unknown, retrieved from https://www.powell.com/App_Themes/default/docs/catalog/powellagshort.pdf.*

William Strunk, Jr., and E.B. White, "The Elements of Style", published 1979, all pages.*

Cellphone-operated tractor invented. Retrieved from the Internet: <URL: http://www.youtube.com/watch?v=vKarhp8RJTc>.

Claas Württemberg GmbH. Retrieved from Internet: <https://www.facebook.com/permalink.php?id=304472412958784&story_fbid=129422920562601>.

Top Agrar (Nov. 2012).

SIMA Innovaiton Awards 2013. Retrived from Internet: <(http://www.landtechnikmagazin.de/Messen-und-Veranstaltungen-Bild-SIMA-Innovation-Award-2013-Goldmedaille-fuer-Claas-UT-App-Universal-Terminal-ISOBUS-20439-3902.php)>.

* cited by examiner

ARRANGEMENT FOR THE CONTROL OF A DEVICE INTERFACE OF AN AGRICULTURAL WORK VEHICLE

CLAIM FOR PRIORITY

This application claims the benefit of priority to German Application No. DE 102014211712.7 filed Jun. 18, 2014, the contents of which are hereby incorporated by reference.

FIELD OF THE DISCLOSURE

The invention concerns an arrangement for the control of a device interface of an agricultural work vehicle.

BACKGROUND

In agriculture, work vehicles, especially tractors, are used for different tasks, for example, for soil cultivation, the spreading of materials, such as seeds or fertilizers, on a field, for harvesting or for transport operations. Accordingly, different devices are coupled with the work vehicle, such as plows, sowing machines, fertilizer spreaders, baling presses, mowing devices, installed forage harvesters, or transport trailers. The work vehicles are therefore equipped with one or more interfaces, on which various devices can be affixed. Such interfaces can comprise a trailer coupling for the coupling of, for example, a transport trailer or a baling press, a rear three-point linkage on the back of the work vehicle, and/or a three-point linkage on the front side of the work vehicle, which are used to affix devices which are not hooked on with a tow bar, for example, mowing devices, forage harvesters, fertilizer spreaders, sowing machines, or plows.

In mounting the devices, the work vehicle has to first be moved to a suitable position with respect to the device. Subsequently, the couplings are to be adjusted in such a way that connecting elements between the work vehicle and the device can be closed. Finally, there is the closing of the connecting elements, so as to implement a temporary hooking of the device on the work vehicle. In the state of the art, these steps are carried out from an operator worksite of the work vehicle. Accordingly, the operator first drives the work vehicle to a suitable place in the vicinity of the device and then adjusts the coupling with respect to the work vehicle, in that he activates input elements, situated on the operator worksite, to control external power actuators for the adjustment of the coupling. Finally, there is the locking of the device on the coupling, which is carried out by remote control from the operator worksite, or directly on site, with a manual intervention on the part of the operator. It is not simple for the operator thereby to arrive at the correct position of the coupling, with respect to the device, from the operator worksite—in particular, if a direct view is not possible, as with front three-point linkages. Often, therefore, the operator must get off his operator worksite, so as to look at the interface, and then after returning to the operator worksite, undertake appropriate inputs to control the actuator. As a result, the hooking on of the device is very time-consuming in many cases.

Arrangements have already been proposed, in which additional input elements to influence the position of couplings and to select a transmission ratio, including a neutral position of a power shift PTO transmission, are placed on a rear fender of the work vehicle. Here, the operator is at the back of the work vehicle when he activates the additional input elements, which is not always optimal from a security viewpoint.

Furthermore, wired or wireless remote controls for agricultural work vehicles have been proposed, with which the operator can control, among other things, a hydraulic power lift and a PTO shaft. Here, a remote control that is specially tailored for the work vehicle is provided, which has proved to be relatively expensive with the not excessively high number of items for agricultural work vehicles.

SUMMARY

An arrangement for the control of a device interface of an agricultural work vehicle has a control unit of the work vehicle, which is connected with an external-power actuator for the purpose of controlling the adjustment of the position of the device interface, and a portable, hand-held computer with input means and a processor, which is in wireless communication with the control unit and which has downloaded software that makes it possible to control the actuator with the input means, via the processor and the control unit.

In this way, a commercially available computer, which may be, in particular, a computer tablet or a smartphone, is used as a remote control for the handling of the actuator of the device interface. A software application is downloaded on the computer, which couples the input means of the computer with the actuator, via the processor of the computer and the control unit of the work vehicle. The operator can therefore move from his operator worksite to a suitable place in the vicinity of the device interface and control the device interface with the input means of the computer, so as to facilitate and accelerate the operation of hooking the device on the workplace.

The device interface can be a front three-point linkage. The actuator is used here to raise and lower the lower guiding element and/or to adjust the length of an upper guiding element and/or to open and close a lock of the device on a guiding element and/or to switch between a simple and a double action of the actuator.

Additionally or alternatively, the device interface can be a rear three-point linkage. The actuator is used there to raise and lower the lower guiding element and/or to adjust the length of an upper guiding element and/or to prolong and shorten the hydraulic stabilizers and/or to open and close a lock of the device on a guiding element.

The device interface can also be a position-adjustable or stationary device coupling, in particular, a trailer coupling. The actuator is used there to open and close the device coupling and/or to adjust the device coupling in the forward direction and/or the vertical direction.

The device interface can be a PTO shaft and the actuator can be used to switch on and off the PTO shaft.

The portable computer can communicate with the control device via a radio connection, in particular, according to a network protocol-based standard (WLAN) or a standard for cell telephones (GSM, UMTS, LTE).

Communication between the computer and the control can take place in such a manner that the control unit is connected with a vehicle bus, which communicates with a device bus via an interface, on which a bus of a separable device that can be coupled with the work vehicle can be connected and which makes it possible for it to control an actuator of the device via a virtual terminal and/or to control an actuator of the work vehicle with a control unit of the device that is connected to the vehicle bus. In addition, a communicator device is connected to the device bus; it comprises a communication control, a protocol converter, and a transmitting and receiving module that communicates with a transmitting and receiving module of the computer. The protocol converter converts a protocol used by the computer, in particular, an internet protocol, into the protocol used by the device bus, in particular, ISO 11783. The communication control simulates a device connected to the device bus, so as to control the position(s) of the device interface(s) of the work vehicle with the computer.

Preferably, with the aid of security criteria filed in a security library, the interface is programmed to check whether, via the vehicle bus, it authorizes a device connected to the device bus to control work vehicle functions, and whether the communication control is operable only after a successful pairing, especially after the exchange of a pairing code and/or the authorization of the computer and the work vehicle, in particular, by near-field communication and/or inputs into the computer and/or a work vehicle terminal by the operator, to send identification to the interface for it to recognize that the communication control and the thereby communicating computer fulfill the security criteria and may send instructions to the device bus.

Due to security considerations, it is useful if remote control of the device interface of the work vehicle is only possible if at least one of the following conditions is fulfilled: the computer and the work vehicle are paired by an exchange of a pairing code; the computer and the work vehicle are successfully authorized among themselves by near-field communication and/or inputs into the computer and/or a work vehicle terminal by the operator; the work vehicle is shut down; in a specified time, the work vehicle has received a heartbeat communication from the computer; and a general timeout is not available.

In particular, the computer and the work vehicle cannot be switched between the first state, in which remote control is not possible, and a second state, in which remote control is possible. Transition from the first state into a second state mode, in which by actuating a touch-sensitive display unit or computer keys, remote control of the device interface is possible, is carried out, in particular, only if the computer and the shutdown work vehicle are paired by an exchange of a pairing code, and are optionally authorized among themselves, and the device interface to be controlled is selected. On the other hand, after a general timeout and/or in the absence of a heartbeat communication and/or with a moving work vehicle, transition to the first state, from which the transition to the described (remote control-enabling) second state mode is automatically possible only with a renewed exchange of a pairing code, and optionally authorization, and after a renewed selection of the device interface to be controlled.

Furthermore, it is proposed that by means of a (timeout-caused or operator-implemented) blocking of its display unit or by the response of a proximity switch that indicates that the operator has stuck the computer into a pocket or has put it away in some other way and thus no longer needs it, the computer is put into a passive mode state, in which remote control is not possible, and from the passive state, a return to the described mode, in which by actuation of a touch-sensitive display unit or computer keys is possible, remote control of the interface site is possible after only a confirmation input, without a new pairing and/or authentication, in which the operator confirms that he wants to continue to control the previously controlled work vehicle.

Finally, a warning light of the work vehicle can be activated if the computer is in a mode in which by actuating a touch-sensitive display unit or computer keys, remote control of the device interface is possible. Alternatively or additionally, vibration of the computer can be activated if, in the aforementioned mode, activation of the touch-sensitive display unit or computer keys takes place.

The disclosed control system can be used on agricultural work vehicles of any type on which devices are affixed, for example, on tractors or on self-propelled harvesting machines, on which, for example, harvesting attachments can be affixed as devices.

BRIEF DESCRIPTION OF THE DRAWINGS

An embodiment example of the invention, described in more detail below, is shown in the drawings. The figures show the following.

DETAILED DESCRIPTION

Figure 1:
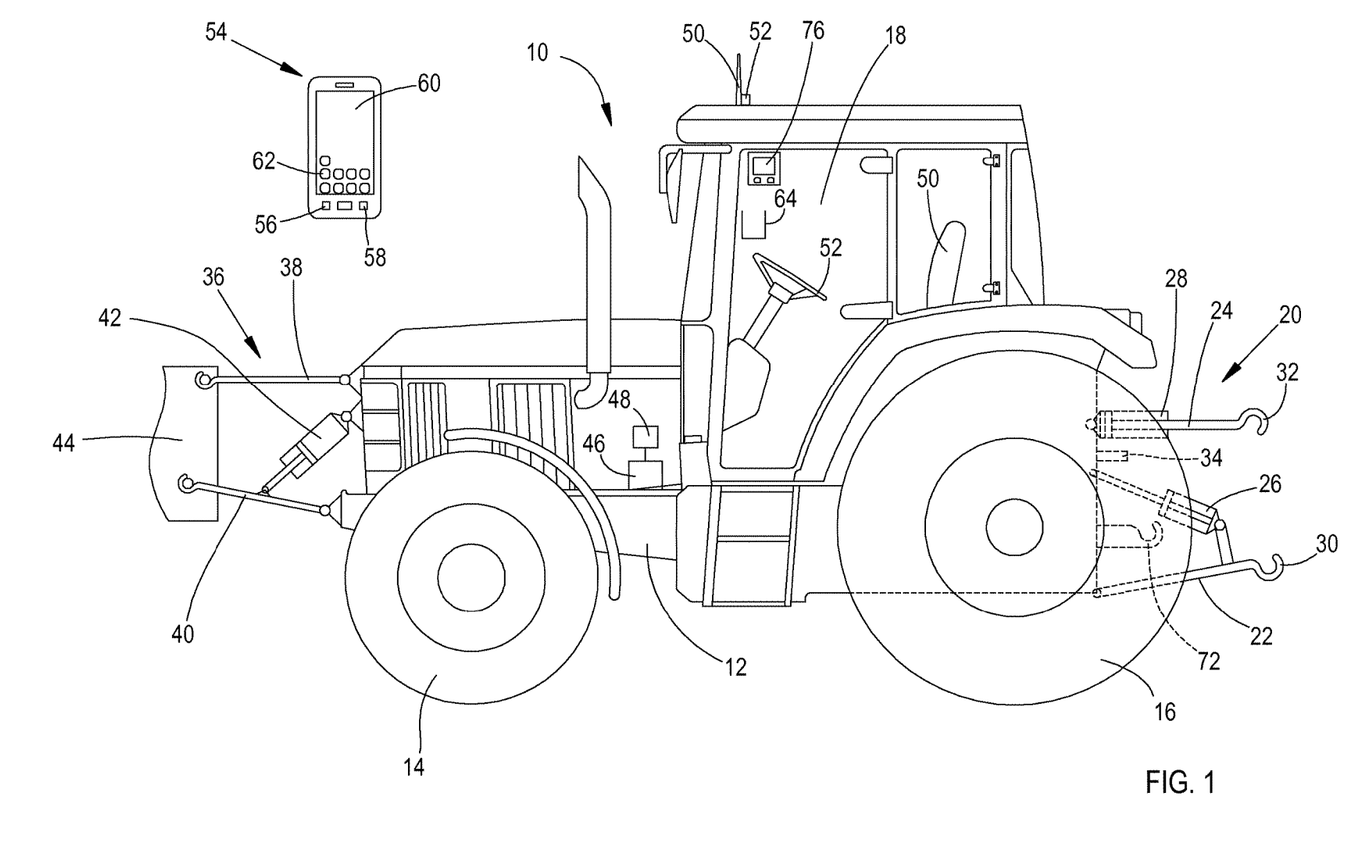
FIG. 1, a lateral view of an agricultural work vehicle, with which a portable computer is correlated as a remote control.

FIG. 1 shows an agricultural work vehicle 10 in the form of a tractor, which is built on a frame 12 and which is supported on the ground by front, steerable wheels 14 and drivable, rear wheels 16. The operator worksite is situated in a cabin 18.

A rear three-point linkage 20 is located on the rear end of the frame 12; it is composed of two lower guiding elements 22, arranged next to one another, and an upper guiding element 24. The lower guiding elements 22 can be adjusted in their height by actuators 26 in the form of hydraulic cylinders. The upper guiding element 24 can be adjusted in its length by an actuator 28 in the form of a hydraulic cylinder. By adjusting the actuators 26, it is possible to bring the rear ends of the lower guiding element 22 into a position in which they can be coupled with any device (not depicted). On the rear end of the lower guiding elements 22, coupling points 30 in the form of arresting hooks (or any other coupling points, for example, coupling eyelets, as they are described in DIN ISO 730-1 Agricultural Machines and Tractors—Rear Three-point Attachment—Part 1: Categories 1, 2, 3, and 4) are arranged, in a manner which is, in fact, known, whereas on the rear end of the upper guiding element 24, a likewise conventional upper guiding element coupling point 32 is provided.

Furthermore, on the rear end of the frame 12, there is a PTO shaft 34 to drive movable elements of the device.

On the front end of the frame 12, there is a front three-point linkage 36, which comprises two lower guiding elements 40, which can be adjusted in their height by means of an actuator 42. Furthermore, the front three-point linkage 36 comprises an upper guiding element 38, which is shown here as an element whose length cannot be adjusted. The guiding elements 38, 40 are connected with a device 44 of any type.

A control unit 46 is connected electrically with a valve unit 48, which, in turn, hydraulically controls, among other things, the actuators 26, 28, 42. The control unit 46 is also connected with a transmitting and receiving module 52, which comprises an antenna 50.

A portable computer 54 comprises a processor 56, a transmitting and receiving module 58, a preferably touch-sensitive display unit 60 and a keyboard 62. The processor 56 communicates, via the transmitting and receiving module 58 and the transmitting and receiving module 52, with the control unit 46, in order to transmit to the work vehicle 10 commands for the actuators 26, 28, 42, which are input via the keyboard 62 that serves as the input means and/or the touch-sensitive display unit 60. The transmitting and receiving modules 52, 58 can communicate with one another via any standard (for example, for cell phones, GSM or UMTS; or computer networks, for example, WLAN or Bluetooth).

The computer 54 can be in the form of a commercially available computer tablet or a smartphone. In order to be able to carry out the described function, it has software which was downloaded as an application, in a manner which is, in fact, known, after authentication of an internet address. If the computer 54 is not needed as a remote control, it can be inserted into a holder 64 in the cabin 18, which serves as a docking station and in which the battery of the computer 54 can be charged. In the holder 64, the computer 54 can be used as the input device for the control of any functions of the work vehicle 10 and, in particular, it can emulate a virtual terminal according to ISO 11783.

The computer 54 can be used as a remote control, so as to facilitate the hooking of a device 44 on one of the device interfaces of the work vehicle 10. Accordingly, the work vehicle 10 is first moved to the vicinity of the device 44, until it is sufficiently near the device 44, so as to couple it. Then, the operator with the computer 54 leaves his operator worksite in the cabin 18 and moves to the vicinity of the relevant interface. Then, he actuates the input means of the computer 54, so as to bring the guiding elements 22, 24, 38, 40 to a suitable position and finally to lock the device 44 on the guiding elements 22, 24, or 38, 40—either manually or by other actuators (not depicted), controlled by means of the computer 54, in the manner described. Analogously, the PTO shaft 34 can also be switched on and off via the computer 54 or a power shift PTO transmission can be brought to a neutral position. In addition, a fixed or adjustable coupling (not depicted) for a tow bar can be opened and closed and optionally adjusted in its position via the computer 54.

Figure 2:
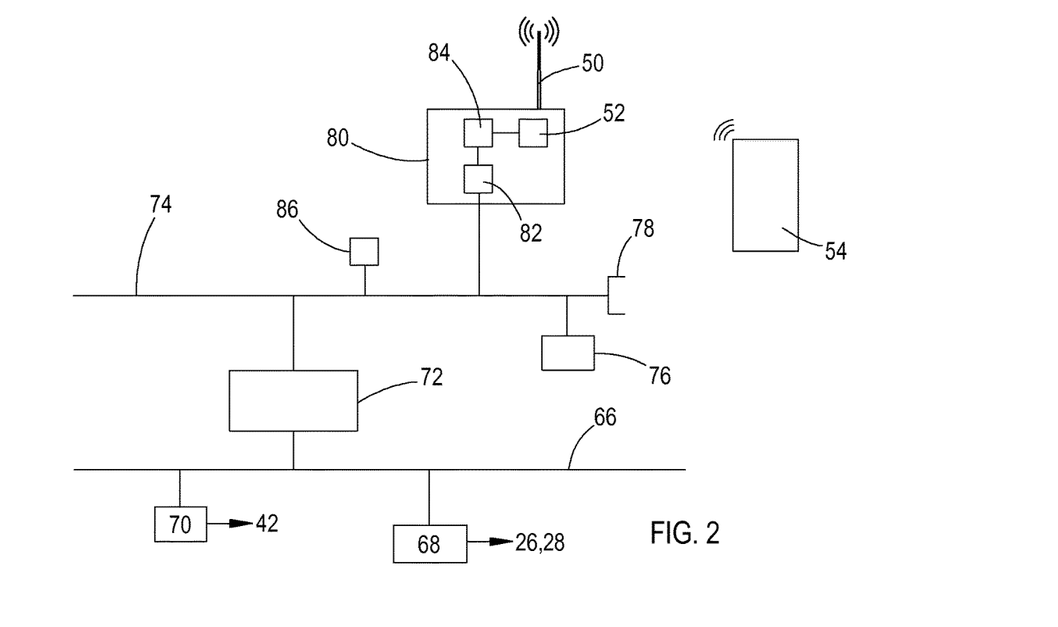
FIG. 2, a circuit diagram of the bus systems of the work vehicle.

FIG. 2 shows the hardware used in the work vehicle 10 in more detail. A vehicle bus 66 connects the control units (controllers) 68, 70, suitable for the work vehicle 10, among one another, which assume the function of the control 46 from FIG. 1. The vehicle bus 66 can use a normal protocol, for example, CAN. The control 68 controls the actuators 26, 28 and the control 70 controls the actuator 42, wherein the actuators 26, 28, 42 either are operated electrically and are energized directly through the correlated control 68 or 70, or the actuators 26, 28, 42 are hydraulically actuated and are controlled via the corresponding control 68 or 70 with the electrohydraulic valve units 48, shown in FIG. 1. Other controls (not depicted) can be connected, in a manner which is, in fact, known, on the vehicle bus 66, such as the motor control, and control other functions of the work vehicle 10. An interface 72, which can serve as a central control unit of the work vehicle 10, connects the vehicle bus 66 with a device bus 74, which can likewise use a common protocol, for example, according to ISO 11783, on which, by an outlet 78, a bus of a device (for example, a baling press), coupled, in a separable manner, with the work vehicle 10, can be connected, so as to control, via a virtual terminal 76, an actuator of the device, or to control, via control of the device, an actuator of the work vehicle 10 (the so-called tractor-implement automation). A communication device 80 is also connected to the device bus 74; it comprises a communication control 82, a protocol converter 84, and the transmitting and receiving module 52. During the operation, the protocol converter 84 converts a protocol used by the computer 54, which is, in particular, an internet protocol, into the protocol used by the device bus 74, in particular, ISO 11783. The communication control 82 simulates a device connected on the device bus 74, so as to control the positions of the device interfaces 20 36 of the work vehicle 10 with the computer 54.

Accordingly, the communication is carried out from the computer 54, via its transmitting and receiving module 56, to the transmitting and receiving module 52 of the communication device 80. The protocol converter 84 converts the protocol used by the computer 54 into that of the device bus 74 and transfers instructions received by the computer 54 (after conversion into instructions of the protocol used by the device bus 74) to the communication control 82, which sends them on, via the device bus 74, the interface 72, and the vehicle bus 66, to the control 68 and/or 70. Conversely, data are transmitted from the control 68, 70 (for example, sensor values regarding the actual position of the actuators 26, 28, 42) to the computer 54. By the communication device 80, it is thus possible for the portable computer 54 to exchange, via its transmitting and receiving module 58, data which arrive via the device bus 74, the interface 72, and the vehicle bus 66, at the controls 68 and 70, with the communication device 80 in both directions, so as to change and be able to recognize the position of the device interfaces 20, 36 of the work vehicle 10 with the computer 54.

Figure 3:
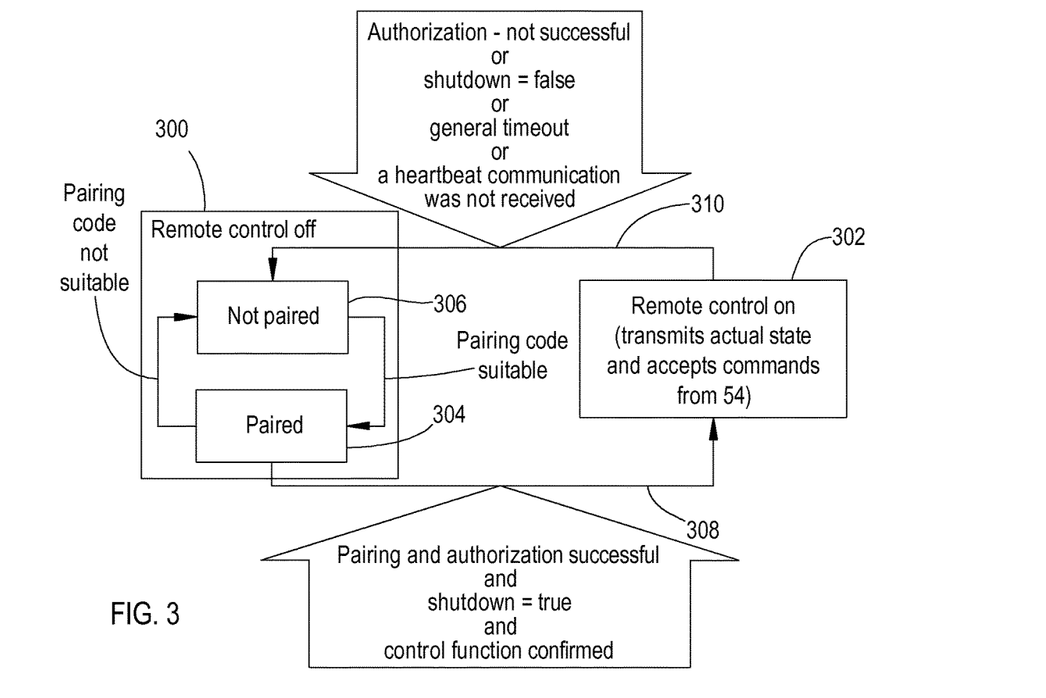
FIG. 3, a scheme with possible states of the work vehicle and portable computer system.

For security reasons, control of the device interfaces 20, 36 is possible through the computer 54 only if a number of conditions are fulfilled. In this regard, reference is made to FIGS. 3 to 5. FIG. 3 shows possible states of the combination of the work vehicle 10 and the computer 54. There are two basic states 300 and 302. In a first state 300, the remote control function of the computer 54 is switched off—that is, control of the actuators 26, 28, 42 is not possible. The first state 300 comprises two substates, namely, a first substate 304, in which the work vehicle 10 and the computer 54 are paired (that is, a connection between one another is produced) and a second substate 306, in which the work vehicle 10 and the computer 54 are not paired. Transition from the first substate 304 into the second substate 306 is possible in that the computer 54 transmits a suitable pairing code to the work vehicle 10, whereas transition from the second substate 306 into the first substate 304 is attained if a pairing code of the computer 54 is not or is no longer suitable for the pairing code of the work vehicle 10.

Transition from the first substate 304 of the first state 300 into the second state 302, in which remote control of the actuators 26, 28, 42 is possible, takes place (transition 308), if the pairing and optional authorization were successful (that is, the pairing codes are suitable and optionally one or more additional conditions are fulfilled); the work vehicle 10 is not moving (speed=0); and a confirmation of the remote control function was undertaken in the computer 54. The latter can take place in that a specific input is carried out in the terminal 76 of the work vehicle 10—for example, by confirmation of an automatic function or automatic steering function. However, it would also be conceivable to omit this confirmation. In the second state 302, remote control of the aforementioned actuators 26, 28, 42 of the work vehicle 10 is then possible by a manual imputing of the operator into the computer 54. In addition, information regarding the actual state of the actuators 26, 28, 42 can then be transmitted from the work vehicle 10 to the computer 54 and can be displayed there.

Transition 310 from the second state 302 into the first state 300 takes place precisely if an authorization of the computer 54 was not successful or the work vehicle 10 is not shut down or there is a general timeout (that is, an input is no longer carried out via the computer 54 over a specific time of, for example, 20 min), or the work vehicle 10 has no longer received a heartbeat communication from the computer 54 over a specific time, which the latter transmits to the work vehicle 10 at predetermined time intervals of, for example, every few seconds.

Figure 4:
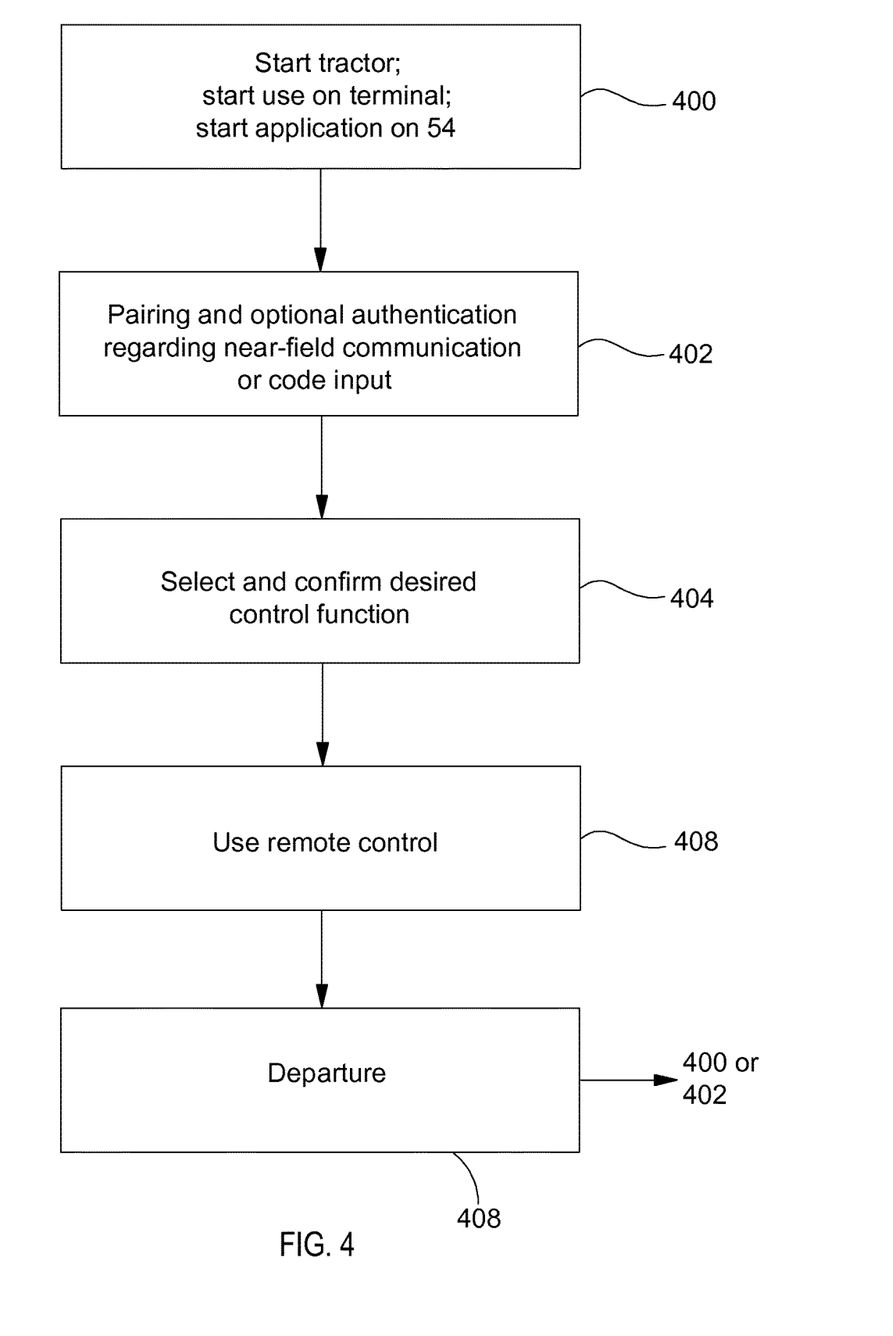
FIG. 4, a flow chart of the procedure followed by the work vehicle and portable computer system in controlling the device interface.

FIG. 4 shows a flow chart, according to which the work vehicle 10 and the computer 54 are operated if remote control function by the computer 54 is desired. In the first step 400, the work vehicle 10 is started (that is, its combustion engine is started); software (in particular, made available by the communication control 82) for the remote control function is started on a work vehicle terminal, which can be the virtual terminal 76 or a terminal connected to the vehicle bus 66, and also, software (application), which has been downloaded (especially from a suitable storage unit), is started on the computer 54. If the application is used for the first time, provision can be made so that the operator inputs into the computer 54, beforehand, an identification code for the work vehicle 10, in particular, the name of a WLAN of the work vehicle 10. In step 402, pairing and authentication of the computer 54 with the work vehicle 10 then take place (the terms authorization and authentication are synonymously used here). In this regard, after wireless communication is produced between the computer 54 and the communication control 82 and both have been identified with respect to one another by exchange of a pairing code, the operator can be asked, via the work vehicle terminal or the display unit 60 of the computer 54, to place the computer 54 on a suitable site in the cabin 18, on which near-field communication takes place between the computer 54 and a suitable near-field communication device 86 of the work vehicle 10 (which can be located in the virtual terminal 76) and the two can be authenticated with respect to one another. Alternatively or additionally, a code can be indicated on the display unit 60 of the computer 54; the operator inputs this code into the work vehicle terminal 76 and confirms it (or vice-versa). However, it would also be conceivable to omit the authentication in step 402 and to rely only on the pairing between the computer 54 and the work vehicle 10.

After pairing and optionally, authentication, the computer 54 is treated by the device bus 74 like a device (for example, a baling press) connected to the socket 78, which, only after fulfilling some security criteria, which are tested by the interface 72 with the aid of a security library that identifies the device, is authorized to control functions of the work vehicle 10 (such as speed or steering). The communication control 82 thus transmits (after a successful pairing and optional authentication of the computer 54, as described with the aid of step 402) identification to the interface 72, with the aid of which the latter recognizes that the communication control 82 (and thus the computer 54) fulfills the security criteria and thus may transmit instructions to the device bus 74. In the case under consideration, the computer 54 controls the controls 68, 70.

After going through step 402 successfully, step 404 is carried out, in which the operator selects a desired control function (control of the front or rear device interface) on the computer 54 and optionally confirms it (see the transition 308 in FIG. 3). In the following step 406, the operator can then control, via the computer 54 (that is, via the touch-sensitive display unit 60 and/or optionally via the keys), the actuators 26, 28, or 42, depending on which control function was selected in step 404. As soon as remote control is no longer undertaken, the operator can leave the remote control mode in step 408 and return to step 400—for example, by leaving the application with the computer 54 or moving the work vehicle 10. If remote control with the computer 54 is desired later, then steps 400 or 402 follow (the latter only if the application has continued in the meantime).

Figure 5:
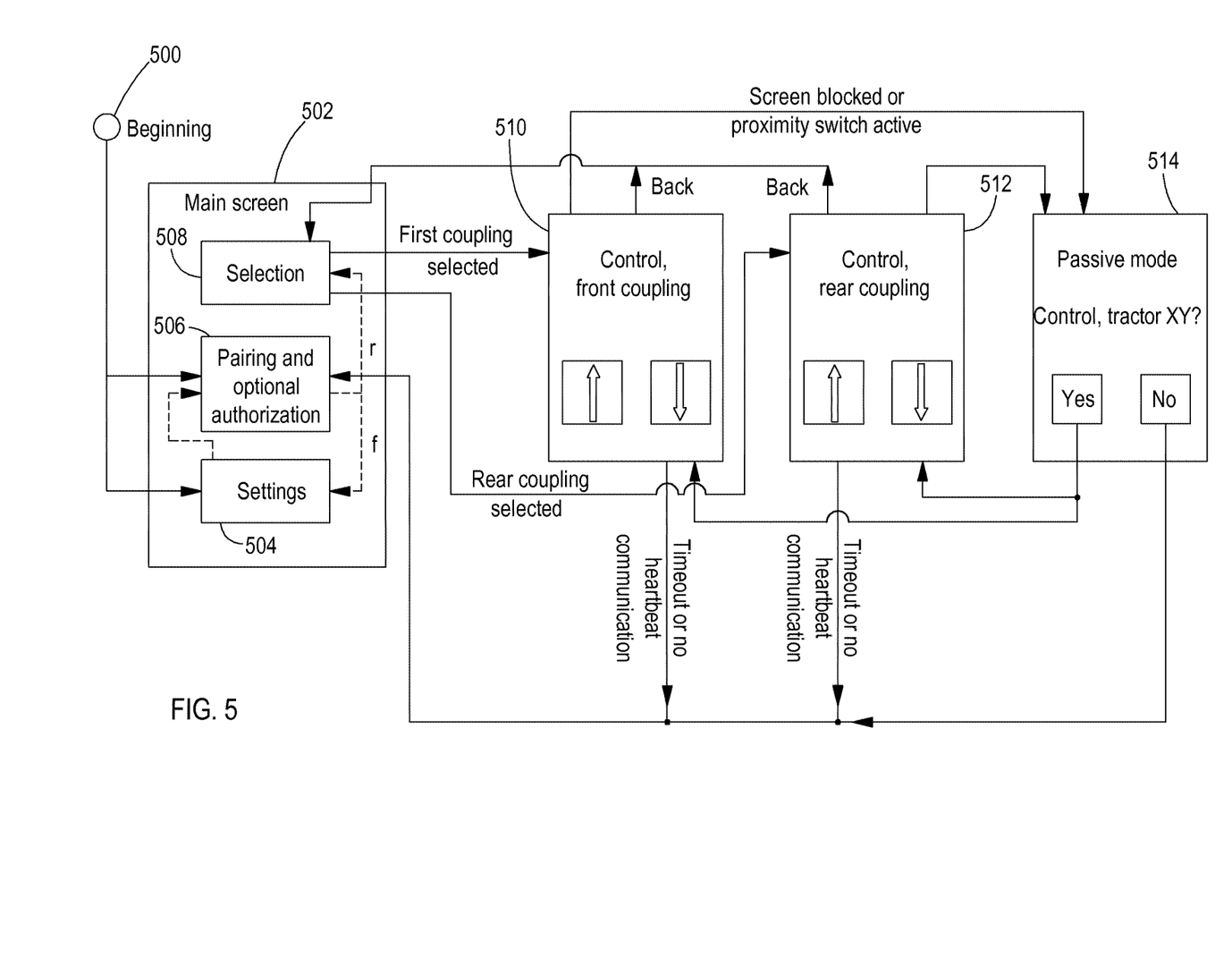
FIG. 5, a scheme with possible portable computer states.

FIG. 5 shows possible states of the computer 54 on which the aforementioned application runs. Proceeding from start 500, one arrives in a main screen mode which offers three options. Proceeding from start 500, one comes either to a setting mode 504, in which settings of the computer 54 (or the work vehicle 10) can be changed—for example, an input of a pairing code (that is, the identification of a network number of the vehicle 10 in the computer 54 for the pairing in steps 304 and 506), which, however, also makes possible transition into authentication mode 506, which can also be reached directly from start 500. In the authentication mode 506, authentication and pairing between the work vehicle 10 and the computer 54, described above with the aid of step 402, are carried out. If they are not successful, the computer 54 again goes over into the setting mode 504.

If, on the other hand, authentication is successful, then one arrives at a selection mode 508, in which the operator is asked if he wants to control the front device interface 36 or the rear device interface 20. In the first case, he arrives then at a mode 510, in which the operator can control the front device interface 36, in that he can press the keys indicated on the touch-sensitive display unit 60 of the computer 54, so as to raise or lower the front device interface 36. At the same time, information regarding the position of the front device interface 36 can be shown on the display unit 60. With the actuation of one of the keys, a haptic feedback can be made to the operator of the computer 54—for example, by the activation of a vibration signal of the computer 54. By a "back" selection, the operator can return the computer 54, once again, to the selection mode 508. In the second case—that is, if the operator has input that he would like to control the rear device interface 20, he arrives at a mode 512, in which the operator can control the rear device interface 20, in that he can press on the keys indicated on the touch-sensitive display device 60 of the computer 54, so as to raise or lower the rear device interface 20. Upon actuating one of the keys, a haptic feedback to the operator of the computer 54 can take place—for example, by activation of a vibration signal of the computer 54. In both modes 510, 512, a warning light (revolving light and/or warning blinker of the work vehicle 10) can be activated, so as to inform persons in the vicinity as to the remote control function which is just taking place. In both modes 510, 512, the computer 54 again goes over into the authentication mode 506 if there is a timeout—that is, over a specific time, the computer 54 has not received an operator input or has not received a heartbeat communication from the work vehicle 10 (see the transition 310 in FIG. 3).

Proceeding from modes 510 and 512, the computer 54 arrives at a passive mode 514 if the display unit 60 is blocked (due to a corresponding input or timeout) or a proximity switch is active, which indicates if the display unit 60 of the computer 54 is covered, which, for example, indicates that the computer 54 is in an operator's pocket, so that remote control is not sensible. In the passive mode 514, the operator is asked by the display unit 60 of the computer 54 if he actually wants to control the pertinent work vehicle 10 with which the computer 54 is currently communicating. If the operator inputs "yes," then he arrives, once again, at mode 510 or 512, from which he has come, and if he inputs "no," then he again arrives at the authentication mode 506 of the main screen 502.

The provided security mechanisms guarantee that errors in the use of the remote control function are largely avoided. By the pairing and optional authentication of the computer 54 with the work vehicle 10, it is ensured that only one single computer 54 can simultaneously communicate with the work vehicle 10. The remote control function is available only when the work vehicle is shut down. With a break in the communication (heartbeat message or timeout), the remote control is also deactivated. Finally, authentication of the computer 54 with the work vehicle 10 and the passive mode 514 prevent the operator from being in the vicinity of a specific work vehicle, for example, after a break, and wanting to control a device interface of this work vehicle, whereas his computer 54, however, is connected with another work vehicle.

What is claimed is:

1. A system for remotely controlling a device interface of an agricultural work vehicle, the system comprising:
    a control unit connected to an external-power actuator to adjust a position of the device interface;
    a vehicle bus connected to the control unit;
    an interface;
    a device bus in communication with the control unit via the interface, the device bus being configured to control the external-power actuator via a virtual terminal;
    a portable computer comprising:
        a processor, and
        a wireless communication unit in communication with the control unit, the portable computer being configured to control the external-power actuator via the processor and the control unit based on an input; and
    a communication device connected to the device bus, the communication device comprising:
        a communication controller configured to simulate a device connected to the device bus, and configured to control of the external-power actuator via the portable computer,
        a protocol converter configured to convert a communication protocol used by the portable computer into an ISO 11783 protocol used by the device bus, and
        a transmitting and receiving module.

2. The system of claim 1, wherein remotely controlling the device interface of the work vehicle can occur if at least one of the following conditions is fulfilled:
    the portable computer and the work vehicle are paired by exchanging a pairing code;
    the portable computer and the work vehicle are authorized successfully between one another by near-field communication or input by an operator into the portable computer or input by the operator into a work vehicle terminal;
    the work vehicle is shut down; or
    in a predetermined time, the work vehicle has received a heartbeat communication from the portable computer and there is no general timeout of the communication between the portable computer and the work vehicle.

3. The system of claim 1, wherein the wireless communication unit is configured to communicate with the control unit via a radio communication according to a network protocol-based standard or a standard for cell phones.

4. The system of claim 1, wherein the device interface is a front three-point linkage and the external-power actuator is configured to:
    raise and lower a lower guiding element of the front three-point linkage;
    adjust a length of an upper guiding element of the front three-point linkage; or
    open and close a lock positioned on a guiding element of the front three-point linkage.

5. The system of claim 1, wherein the device interface is a rear three-point linkage and the external-power actuator is configured to:
    raise and lower a lower guiding element of the rear three-point linkage;
    adjust a length of an upper guiding element of the rear three-point linkage; or
    extend and retract hydraulic stabilizers.

6. The system of claim 1, wherein the device interface is a trailer coupling, and the external-power actuator is configured to:
    open and close the trailer coupling; or
    adjust the trailer coupling in a forward direction or a vertical direction.

7. The system of claim 1, wherein the device interface is a PTO shaft, and the external-power actuator is configured to switch the PTO shaft on and off.

* * * * *